United States Patent
Yasuhara et al.

(10) Patent No.: US 7,775,030 B2
(45) Date of Patent: Aug. 17, 2010

(54) POWER TRANSMISSION CHAIN, METHOD FOR MANUFACTURING THE SAME, AND POWER TRANSMISSION APPARATUS

(75) Inventors: Shinji Yasuhara, Yamatokoriyama (JP); Hiroshi Toyota, Tondabayashi (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 0 days.

(21) Appl. No.: 11/643,993

(22) Filed: Dec. 22, 2006

(65) Prior Publication Data

US 2007/0144137 A1   Jun. 28, 2007

(30) Foreign Application Priority Data

Dec. 26, 2005   (JP)   ............... P2005-372232

(51) Int. Cl.
F16G 5/18   (2006.01)
F16G 13/06   (2006.01)

(52) U.S. Cl. ............... 59/8; 59/35.1; 474/214; 474/215

(58) Field of Classification Search ............... 59/6, 59/8, 29, 35.1; 474/201, 214, 215, 216, 219, 474/221, 223, 224, 225

See application file for complete search history.

(56) References Cited

U.S. PATENT DOCUMENTS

| 4,718,881 A | 1/1988 | Sugimoto et al. |
| 4,911,682 A * | 3/1990 | Ivey et al. ............ 474/245 |
| 5,445,570 A | 8/1995 | White |
| 6,142,903 A * | 11/2000 | Heinrich ............ 474/215 |
| 6,824,484 B2 * | 11/2004 | Greiter ............ 474/201 |
| 7,140,173 B2 * | 11/2006 | Van Rooij ............ 59/7 |
| 2003/0186767 A1 | 10/2003 | Greiter |

FOREIGN PATENT DOCUMENTS

| JP | 8-74938 | 3/1996 |
| JP | 8-312725 | 11/1996 |
| JP | 2005-299755 | 10/2005 |
| JP | 2005-299756 | 10/2005 |
| WO | 2005/045280 | 5/2005 |

OTHER PUBLICATIONS

European Office Action with English Translation dated Feb. 15, 2008.

* cited by examiner

*Primary Examiner*—David B Jones
(74) *Attorney, Agent, or Firm*—McGinn IP Law Group PLLC

(57) ABSTRACT

Larger pre-tension is applied to each link such that residual compressive stress is larger at the portion of the link facing the inside of a chain than the outside. Assuming that for each of the links in a state that pre-tension is not applied, a predetermined pitch is P, a first inclination angle of a fixing portion of the front inserting portion with respect to a chain proceeding direction is $\alpha$, and a second inclination angle of a fixing portion of the rear inserting portion with respect to a chain proceeding direction is $\beta$, when the pre-tension is applied to each of the links, the pitch changes into $P+\Delta P$, the first inclination angle changes into $\alpha-\Delta\alpha$ and the second inclination angle changes into $\beta+\Delta\beta$ where $\Delta P>0$, $\Delta\alpha>0$, and $\Delta\beta>0$.

6 Claims, 5 Drawing Sheets

US 7,775,030 B2

POWER TRANSMISSION CHAIN, METHOD FOR MANUFACTURING THE SAME, AND POWER TRANSMISSION APPARATUS

BACKGROUND OF THE INVENTION

The present invention relates to a power transmission chain, and more particularly, to a power transmission chain, a method of manufacturing the power transmission chain, and a power transmission apparatus suitable for a continuously variable transmission (CVT) for vehicles.

A continuously variable transmission for vehicles known in the art, as shown in FIG. 7, includes a driving pulley 2 having a stationary sheave 2a and a movable sheave 2b and connected to an engine, a driven pulley 3 having a stationary sheave 3b and a movable sheave 3a and connected to driving wheels, and an endless power transmission chain 1 wound around the pulleys. As for the continuously variable transmission, the chain is clamped by hydraulic force by moving the movable sheaves 2b and 3a to or away from the stationary sheaves 2a and 3b using a hydraulic actuator, contact load between the pulleys 2 and 3 and the chain 1 is generated from the clamping force, and torque is transmitted by frictional force at the contact portions therebetween.

Disclosed in JP-A-8-312725, a power transmission chain includes a plurality of links having front and rear inserting portions into which pins are inserted, a plurality of first pins and second pins connecting links that are arranged in a width direction of the chain such that the front inserting portion of a link corresponds to the rear inserting portion of another link, and enabling them to longitudinally bend with respect to each other. As for the above power transmission chain, a first pin fixed to the front inserting portion of a link and movably inserted in the rear inserting portion of another link and a second pin movably inserted in the front inserting portion of the former link and fixed to the rear inserting portion of the later link relatively move through rolling-contact, and the links longitudinally bend.

It is required for improving durability for the above power transmission chain, because the durability of links is particularly important. Further, it is also important to reduce noise. However, because the shape of the front and rear inserting portions of links determined in designing are slightly deformed in a manufacturing process, a desired effect of reducing noise cannot be obtained in a complete chain.

SUMMARY OF THE INVENTION

It is an object of the invention to provide a power transmission chain that can increase durability of links and reduce noise of the chain, a method of manufacturing the power transmission chain, and a power transmission apparatus.

According to the present invention, a power transmission chain comprises:

a plurality of links that include front and rear inserting portions into which pins are to be inserted; and a plurality of first pins and second pins that are arranged in a front and in a rear, respectively, and connect the links arranged in a width direction of a chain so that the front inserting portion of ones of the links corresponds to the rear inserting portion of the other links, wherein the ones of the links longitudinally bend with respect to the other links through relative rolling-contact movement of the first and second pins, wherein ones of the first and second pins are fixed to the front inserting portions of the ones of the links and movably inserted in the rear inserting portions of the other links, wherein the other of the first and second pins are movably inserted in the front inserting portion of the ones of the links and fixed to the rear inserting portion of the other links, and wherein larger residual compressive stress acts in a portion of the link facing an inside of the chain as compared with an outside of the chain.

The residual compressive stress is given by applying tension (pre-tension) to the chain in advance. In the link, the portion under larger residual compressive stress is improved in fatigue life under the same load, as compared with the portion under smaller residual compressive stress. On the other hand, as for the chain in use, the radial inner portion of the chain is under larger load than the outer portion. Therefore, a portion of the chain under relatively large load (an inner portion of the chain) is improved in fatigue life by giving large residual compressive stress to the inner portion (radial outside) of the chain than the outer portion (radial outside).

The pre-tension may be applied to the chain in an endless shape or may be applied to the chain in a linear shape (before formed in an endless shape). When applying the pre-tension, it is usual to applying tension to the endless chain wound around pulleys using a device having pulleys of a continuously variable transmission, but is not limited thereto.

The pre-tension is determined such that the maximum main stress created in the link is above the elastic limit stress of the link. Therefore, the link permanently deforms and is given appropriate residual compressive stress inside, and durability against fatigue is improved.

As for a power transmission chain according to the invention, at least one of the first and second pins contacts with pulleys and thus power is transmitted through frictional force due to the contact therebetween. As for a chain in which any one of pins contacts with pulleys, any one of first and second pins is a contact pin (hereinafter, referred to as a first pin or pin) that contacts with pulleys when the chain is used for a continuously variable transmission, and the other pin is a non-contact pin (referred to as an interpiece or strip, hereinafter a second pin or interpiece).

The link, for example, may be made of spring steel or carbon tool steel. A material for the link may be any other steel, such as bearing steel, not limited to spring steel or carbon tool steel. The front and rear inserting portions of the links may be individual through holes (link having a partition) or one through hole (link without partition). Suitable steel such as bearing steel is used for a material for the pin.

To insert the pins into the front and rear inserting portions and fix to the inserting portions, for example, fitting is done at the circumferences of the pins and the insides of the inserting portions by mechanical press-fitting, but shrink-fitting or expansion-fitting may be used instead. A first pin and a second pin are fitted in one inserting portion and face each other in the longitudinal direction of the chain and any one of them is fixed-to the inside of the inserting portion of the link. It is preferable that the fixing is performed at portions (upper and lower portion) of the inserting portion perpendicular to the longitudinal direction. After the fixing, pre-tension is applied in a pre-tension applying process, so that appropriate residual compressive stress is uniformly and accurately acts in the pin-fixing portion (pin press-fitting portion) of the link.

According to the present invention, assuming that for each of the links in a state that pre-tension is not applied, a predetermined pitch is P, a first inclination angle of a fixing portion of the front inserting portion with respect to a chain proceeding direction is $\alpha$, and a second inclination angle of a fixing portion of the rear inserting portion with respect to a chain proceeding direction is $\beta$, when the pre-tension is applied to each of the links, the pitch changes into P+ΔP, the first inclination angle changes into α−Δα and the second inclination angle changes into β+Δβ where ΔP>0, Δα>0, and Δβ>0.

The pitch is the distance from the contact point of first and second pins in the front inserting portion and the contact point of first and second pins in the rear inserting portion. The first inclination angle of the pin-fixing portion is the angle for the portion of the link where a first pin is fixed (the surface contacting with the first pin) with respect to the chain proceeding direction and the second inclination angle of pin-fixing portion is the angle for the portion of the link where the second pin is fixed (the surface contacting with the second pin) with respect to the chain proceeding direction. The reference line for the first and second inclination angles of pin-fixing portions may be positioned at anywhere, but the angles herein are measured based on the chain proceeding direction.

In the related art, when a desired shape of the link is determined, the parameters P+ΔP, α−Δα, and β+Δβ after pre-tension is applied are the design parameters, not the parameters P, α, and β before pretension is applied, so that the parameters P, α, and β before pretension is applied are selected to obtain the design parameters after pre-tension is applied. The parameters have the relationships of P>0, Δα>0, and Δβ>0, so that it is easy to determined the parameters before pre-tension is applied.

That is, the pitch is determined such that the initial pitch (before pre-tension) is smaller than the desired pitch (after pre-tension), in consideration of increase of the pitch in dimension due to the load of pre-tension. Because the changes in pitch depend on the whole length of the chain and the numbers of links arranged in the width direction of the chain, they are considered for every specifications of chain. Other important parameters, except for the pitch, are angles of first and second pins, i.e. first and second inclination angles of pin-fixing portions of the link. First and second pins fixed in the link are positioned such that the upper portions are slightly spaced in parallel (completed in FIG. 3) and the space between their lower portions in the initial state (before pre-tension) is smaller than the complete state (after pre-tension). The inclination angles of the pins in the link (first and second inclination angles of pin-fixing portions) are determined in consideration of changes, i.e. increase and decrease by the load of pre-tension, in the initial design. The changes in angle depend on the whole length of the chain, the numbers of links arranged in the width direction of the chain, so that they are considered for every specifications of the chain.

According to the present invention, a locus formed by a contact point between the first and second pins is an involute curve, and a contact point between the first and second pins in a straight region of the chain is positioned inside with respect a reference line which is an exact center line formed between the inside and outside of the chain.

The power transmission chain has improved effect of reducing noise, but the shape of the link easily deforms when pre-tension is applied to increase durability. For this reason, effect of reducing noise considered in designing may be decreased as compared with a designed level. Therefore, for the power transmission chain having the above configuration, larger residual compressive stress is applied to the inner portion of the chain than the outer portion, so that, in a complete chain, links having desired parameters are obtained and intended effect of reducing noise and durability can be obtained.

As for the first and second pins, for example, the contact surface of any one of them is flat and the contact surface of the other forms an involute curve for relative movement through rolling-contact. Further, it is preferable for the first and second pins to have necessary curved surface, respectively.

In the power transmission chain, any one (interpiece) of the pins is shorter than the other (pin), and the ends of the longer pin is in contact with conical sheave surfaces of pulleys of continuously variable transmission and power may be transmitted by frictional force due to the contact therebetween. The pulleys are a stationary sheave having conical sheave surfaces and a movable sheave having conical sheave surfaces corresponding to the sheave surfaces of the stationary sheave. The chain is interposed between the sheave surfaces of the sheaves. As the movable sheave is moved by a hydraulic actuator, the distance between the sheave surfaces of the continuously variable transmission, i.e. the radius of the chain wound around the pulleys is changed and continuously variable transmission smoothly operates.

The power transmission apparatus according to the invention includes a first pulley having conical sheave surfaces, a second pulley having conical sheave surfaces, and a power transmission chain having the above arrangement wound around the first and second pulleys.

The power transmission apparatus is suitable to a continuously variable transmission for automobiles.

According to the present invention, a method of manufacturing the power transmission chain comprises of:

giving a larger deformation margin to a portion of a link of the chain facing an inside of the chain; and applying pre-tension to the chain so that larger residual compressive stress acts in the portion of the link facing the inside of the chain as compared with an outside of the chain.

According to a power transmission apparatus of the invention, since larger residual compressive stress acts in the inner portion of the chain of the link as compared with the outer portion, fatigue life of the inner portion of the chain under relatively large load is improved and the general fatigue life for the link is improved.

Pre-tension is applied to the links to give the residual compressive stress. The link has a predetermined pitch P, a first inclination angle α of fixing portion, and a second inclination angle β of fixing portion before pre-tension is applied, and the pitch changes into P+ΔP, the first inclination angle of pin-fixing portion changes into α−Δα, and the second inclination angle of pin-fixing portion changes into β+Δβ, after the pre-tension is applied, where ΔP>0, Δα>0, and Δβ>0. Accordingly, in a complete chain, links having desired parameters are obtained and intended effect of reducing noise and durability can be obtained.

DETAILED DESCRIPTION OF PREFERRED EMBODIMENTS

Preferred embodiments of the invention are now described hereafter with reference to accompanying drawings. "Up" and "down" herein indicates up and down in FIG. 3.

Figure 1:
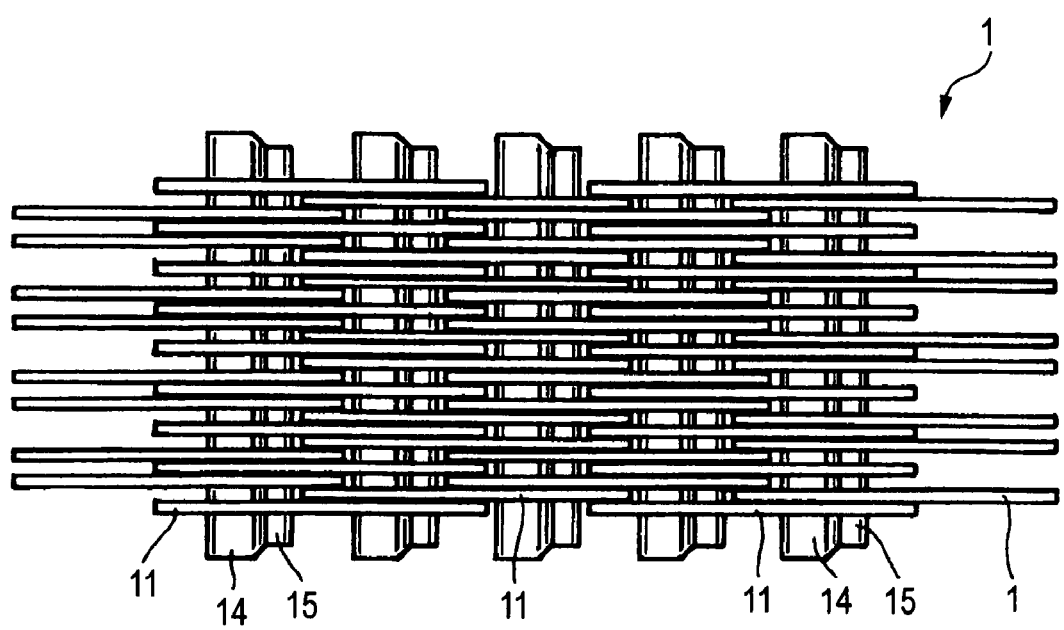
FIG. 1 is a plan view of a part of a power transmission chain 1 according to an embodiment of the invention.
Figure 2:
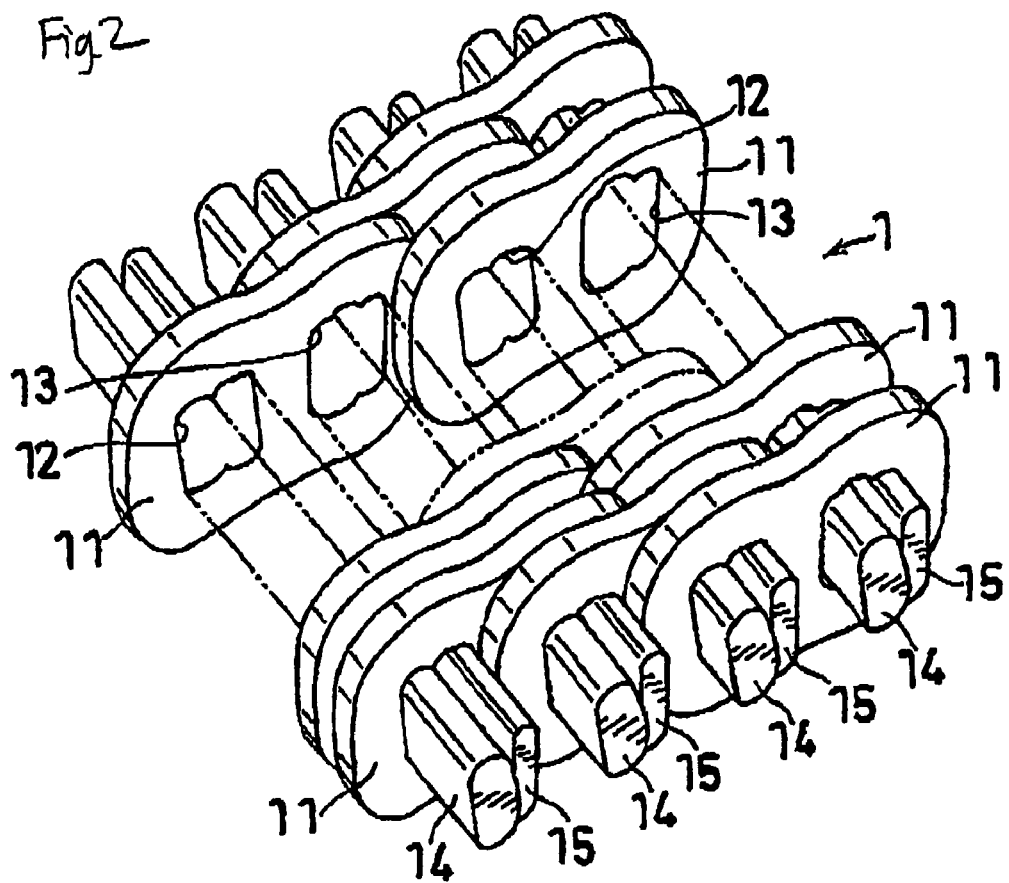
FIG. 2 is a perspective expanded view of the chain 1 of FIG. 1.

FIGS. 1 and 2 show a part of a power transmission chain according to an embodiment of the invention. A power transmission chain 1 includes a plurality of links 11 having front and rear inserting portions 12 and 13 formed at a predetermined distance in the longitudinal direction of the chain, and a plurality of pins (first pins) 14 and interpieces (second pins) 15 connecting links arranged in the width direction of the chain and enabling them to bend in a longitudinal direction.

Figure 3:
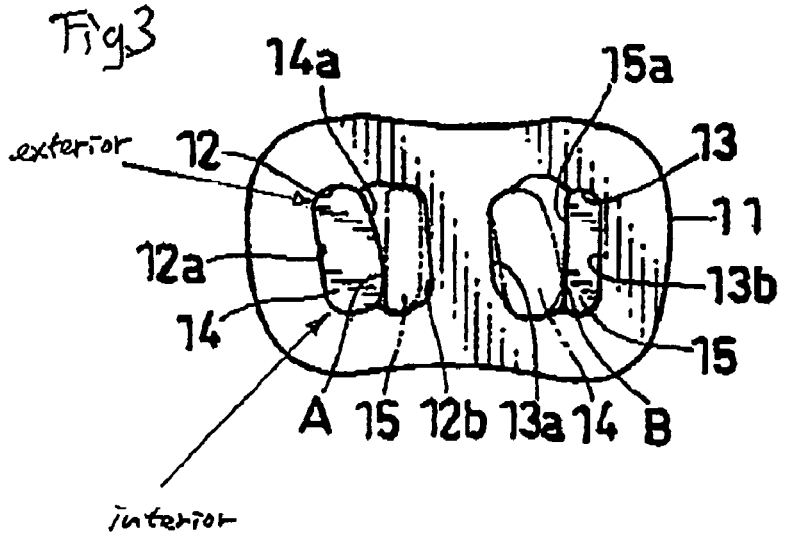
FIG. 3 is an expanded side view of a link.

As shown in FIG. 3, the front inserting portion 12 has a pin-fixing portion 12a into which the pin 14 is fixed (solid line) and an interpiece-movable portion 12b to which the interpiece 15 is movably insert (two-dot chain line). The rear inserting portion 13 has a pin-movable portion 13a into which the pin 14 is movably insert (two-dot chain line) and an interpiece-fixing portion 13b to which the interpiece 15 is fixed (solid line). To connect links 11 arranged in the width direction of the chain, links 11 are interposed such that the front inserting portion 12 of a link 11 corresponds to the rear inserting portion 13 of another link 11, and then a pin 14 is fixed in the front inserting portion 12 of the former link 11 and also movably inserted into the rear inserting portion 13 of the later link 11. Further, an interpiece 15 is movably inserted into the front inserting portion 12 of the former link 11 and also fixed in the rear inserting portion 13 of the later link 11. Accordingly, the pin 14 and the interpiece 15 relatively move through rolling-contact, so that the links 11 are relatively bendable with respect to each other in the longitudinal direction (front and back) of the links 11.

The locus formed by contact points of the pin 14 and the interpiece 15 with respect to the pin 14 is an involute curve of a circle. In the present embodiment, the cross section of a contact surface 14a of the pin 14 has an involute curve of a reference circle of radius Rb and center M and a contact surface 15a of the interpiece 15 is flat (straight line in the cross section). For this reason, as a link 11 of the chain 1 moves from a straight region into an arc region or from an arc region into straight region, in the front inserting portion 12, the interpiece 15 moves with respect to the fixed pin 14 in the interpiece-movable portion 12b through rolling-contact (including sliding-contact a little) of the contact surface 15a with the contact surface 14a of the pin 14. Further, in the rear inserting portion 13, the pin 14 moves with respect to the fixed interpiece 15 in the pin-movable portion 13a through rolling-contact (including sliding contact a little) of the contact surface 14a with the contact surface 15a of the interpiece 15. In FIG. 3, reference characters A and B indicate the contact lines (points in cross section) of the pin 14 and interpiece 15 in the straight region of the chain 1, and the distance between A and B is a pitch.

The power transmission chain 1 is formed by connecting a plurality of link units in the chain proceeding direction, where a link unit is composed of three link series arranged in the chain proceeding direction (front and back) and a link series is composed of a plurality of links having the same backlash alignment in the width direction of the chain 1. As for the present embodiment, a link unit is composed of a link series with nine links and a link series with eight links.

The power transmission chain 1 is manufactured by vertically disposing a desired number of pins 14 and interpieces 15 on a board first and then press-fitting them into a link 11 one by one or a plurality of links collectively. The press-fitting is done between the upper and lower peripheries of the pins 14 and interpieces 15 and the upper and lower peripheries of the pin-fixing portion 12a and interpiece-fixing portion 13b, and the press-fitting margin is in the range of 0.005 to 0.1 mm. Accordingly, the tension (pre-tension) acts in the completed chain 1.

When the pre-tension acts, a larger deformation margin is given to the portion of the link 11 facing the inside (downward in FIG. 3) compared with the outside (upward in FIG. 3) of the chain 1. Therefore, in a pre-tensioning process, larger pre-tension is applied to the link 11 such that residual compressive stress is larger at the portion of the link 11 facing the inside than the outside of the chain 1.

Figure 4:
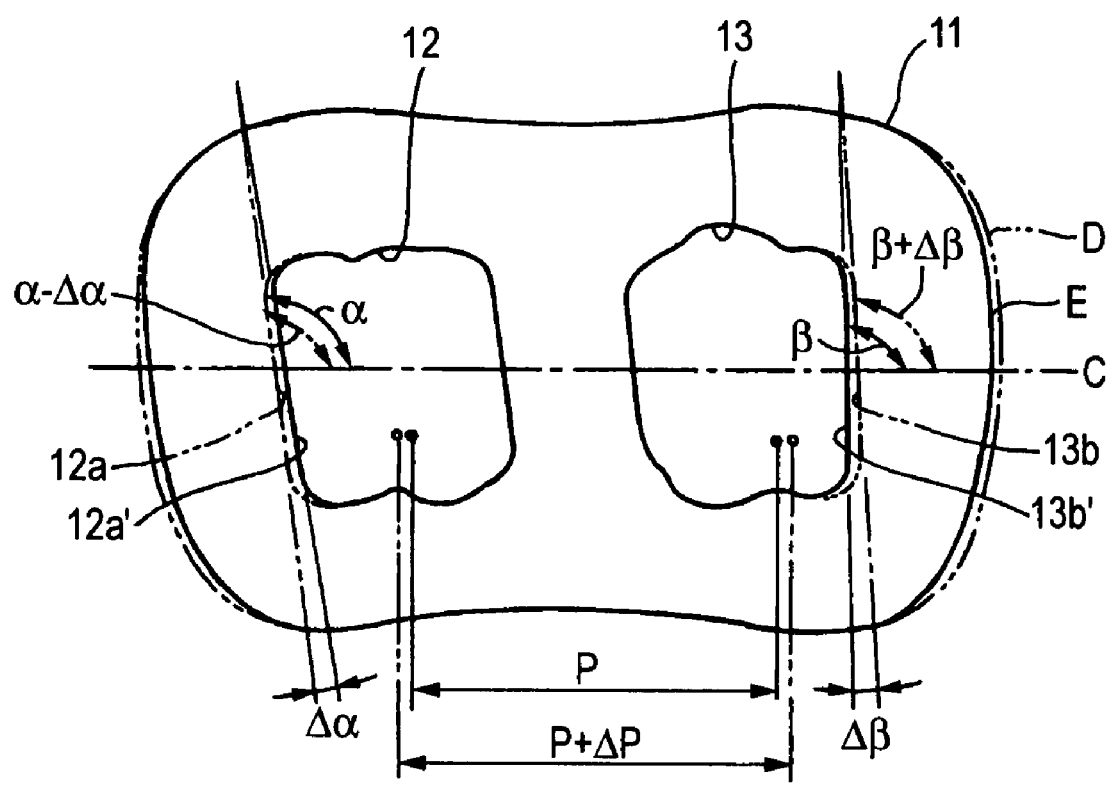
FIG. 4 is a view for comparing the conditions of the link before and after pre-tension is applied.

Referring to FIG. 4, a solid line E shows the shape of the link 11 before pre-tension is applied, and a two-dot chain line D show the shape of the link 11 that after pre-tension is applied. The link 11 has a predetermined pitch P, a first inclination angle α of fixing portion, and a second inclination angle β of fixing portion. The pitch P is the distance from the contact point (A of FIG. 3) of the pin (first pin) 14 and the interpiece (second pin) 15 in the front inserting portion 12 to the contact point (B of FIG. 3) of the pin 14 and the interpiece 15 in the rear inserting portion 13. The first inclination angle α of fixing portion is the angle from a line in the chain proceeding direction C to the pin-fixing portion 12a of the link 11 (i.e. a surface contacting with the pin 14). The second angle β of fixing portion is the angle from a line in the chain proceeding direction C to the interpiece-fixing portion 13b of the link 11 (i.e. a contact surface with the interpiece 15).

When the pre-tension is applied to the chain, the pitch changes into P+ΔP, the first inclination angle of pin-fixing portion changes into α−Δα, and the second inclination angle of pin-fixing portion changes into β+Δβ, where ΔP>0, Δα>0, and Δβ>0. In other words, while the pitch P is increased by pre-tension (elongated in the chain proceeding direction), the pin-fixing portion 12a' and the interpiece-fixing portion 13b' before pre-tension is applied are deformed into the pin-fixing portion 12a and interpiece-fixing portion 13b after pre-tension is applied, i.e. into a reversed-U shape (that is, the lower portions widen in FIG. 4).

Accordingly, when a desired shape of the link 11 is determined, the parameters P+ΔP, α−Δα, and β+Δβ after pre-tension is applied are the design parameters, not the parameters P, α, and β before pretension is applied, so that the parameters P, α, and β before pretension is applied are selected to obtain the design parameters after pre-tension is applied. The parameters have the relationships of P>0, Δα>0, and Δβ>0, so that it is easy to determine the parameters before pre-tension is applied.

As for the chain-typed power transmission chain 1, polygonal vibration is caused by repetitively moving up and down the pin and results in making noise. Because the pin 14 and interpiece 15 relatively move through rolling-contact and the locus of the contact point of them forms the involute curve of the circle for the pin 14, vibration is reduced as compared with when both contact surfaces of the pin and the interpiece form an arc surface, thus noise is also reduced. In other words, as shown in FIG. 5, even though the pin 14 and interpiece 15 are engaged with the pulley 2, the chain 1 is continuously pulled in the direction of a line L shown by one-dot chain line, so that it is possible to reduce to the minimum the polygonal vibration of the chain 1 due to the engaging positions and movement after engaging.

Figure 5:
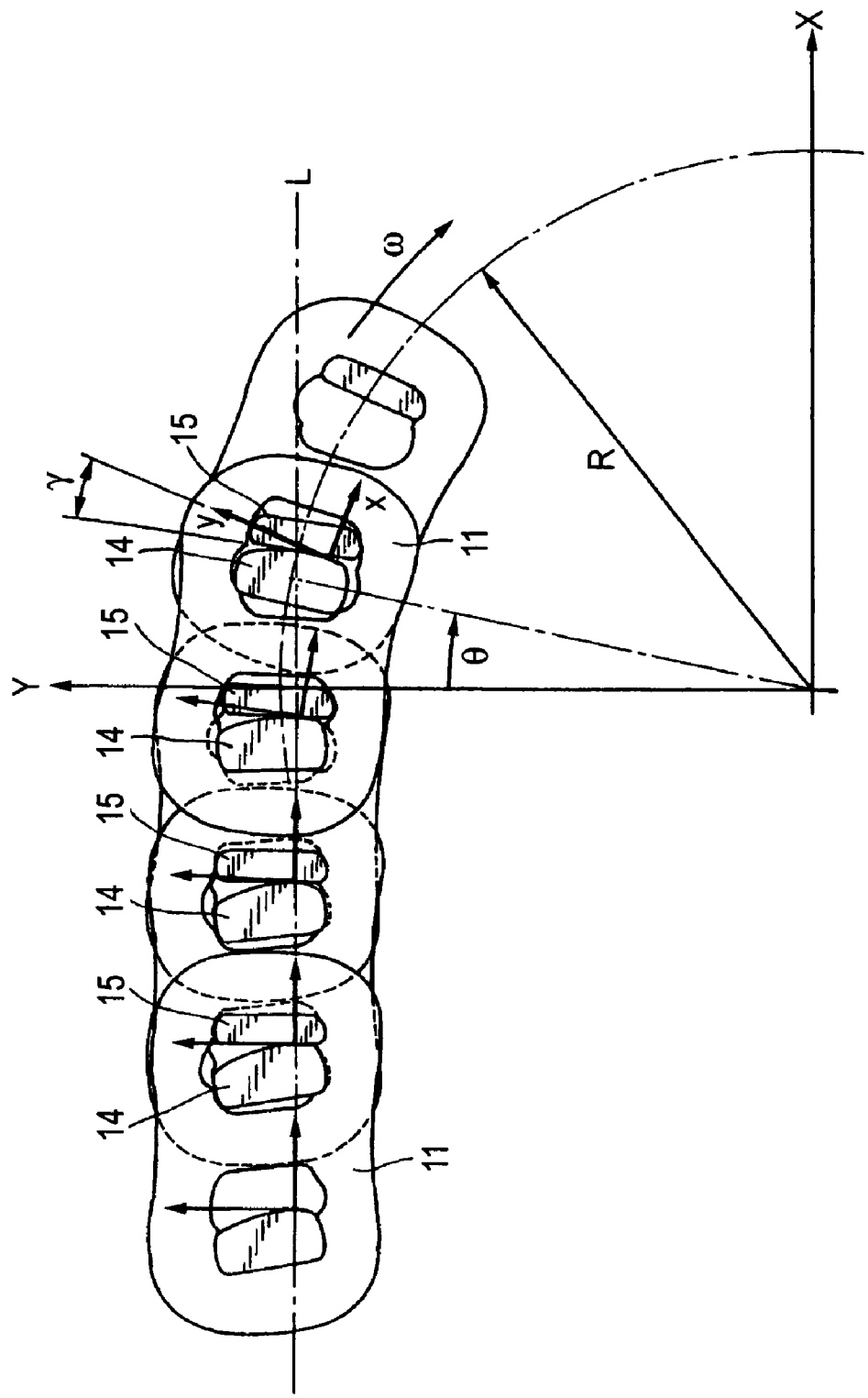
FIG. 5 is a view illustrating the conditions of a pin before and after the pin is engaged with the power transmission chain.

In FIG. 5, assuming that the origin is the center of curved region of the chain, the X-axis is the line passing the origin parallel with the straight region of the chain, and the Y-axis is perpendicular to the X-axis, and an angle made by the Y-axis and a line passing the origin and the center of a pin rolling at the curved region of the chain is θ. Further, assuming that another origin is the contact point of the pin 14 and interpiece 15 in the straight region of the chain, the x-axis is a line parallel with the straight region and the y-axis is a line perpendicular to the x-axis, and an angle γ is made by a tangential line at the contact point of the pin 14 and interpiece 15 in the curved region of the chain and the y-axis, an circular involute curve satisfy the following equations for the radius Rb of the reference circle.

$$x = Rb \cdot (\sin\gamma - \gamma \cdot \cos\gamma)$$

$$y = Rb \cdot (\cos\gamma + \gamma \cdot \sin\gamma) - Rb$$

Where a radius Rb of a reference circle is the smallest radius when the chain is used for CVT.

Countless involute curves exist for the radius of the reference circle and the same effects can be obtained even though the radius of the reference circle is changed. Accordingly, when the smallest radius of the chain for CVT is R, the tolerance for involute curves is expressed through the followings, $$x = k \cdot R \cdot (\sin\gamma - \gamma \cdot \cos\gamma)$$

$$y = k \cdot R \cdot (\cos\gamma + \gamma \cdot \sin\gamma) - k \cdot R$$

where, when the smallest radius of the curved region of the chain when it is used for CVT is R and the transmission gear ratio of the CVT is r, it is preferable to determine k within the following range.

$$0.25 < k < 2r$$

The locus constructed by the rolling-contact movement is not limited to the involute curves of the contact points between the first and second pins and may be non-involute curves (curves similar to an involute curve) between involute curves of k=0.25 and k=2r (curves of allowable upper and lower limits).

The chain 1 in which effects in reducing noise is improved and durability is increased by appropriately selecting the shapes of the pin 14 and interpiece 15 can be obtained. However, if the shape of the link 11 is changed before and after pre-tension is applied, the desired effects in reducing noise and increasing durability may not be sufficiently obtained. As described above, however, according to the present embodiment, since the desired parameters of the link 11 after pre-tension is applied are determined in consideration of the changes in the shape of the link 11 before and after pre-tension is applied, both effects in increasing durability of the link 11 and reducing noise of the chain 1 can be achieved.

Figure 6:
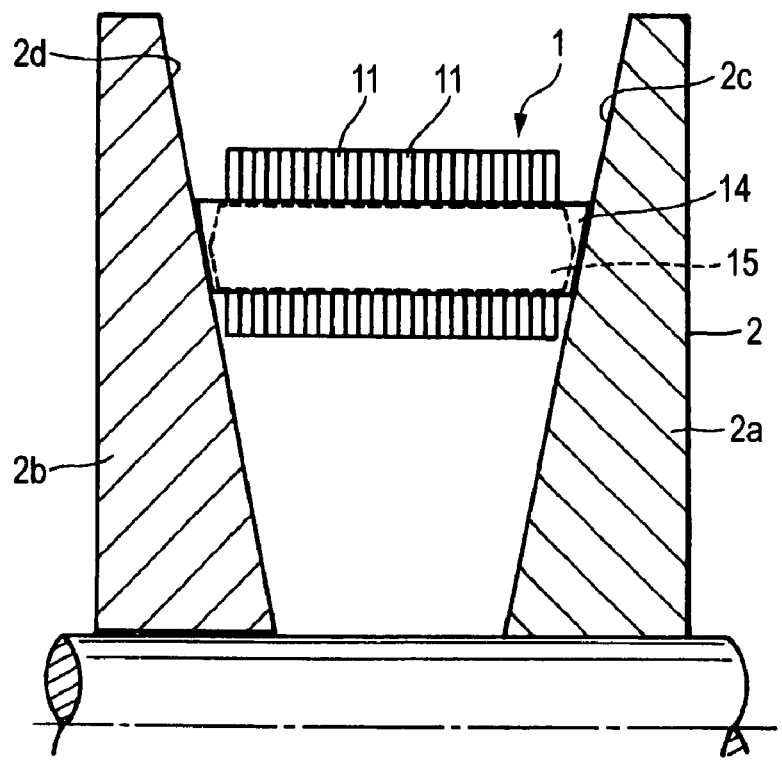
FIG. 6 is a front view illustrating the power transmission chain wound around a pulley.
Figure 7:
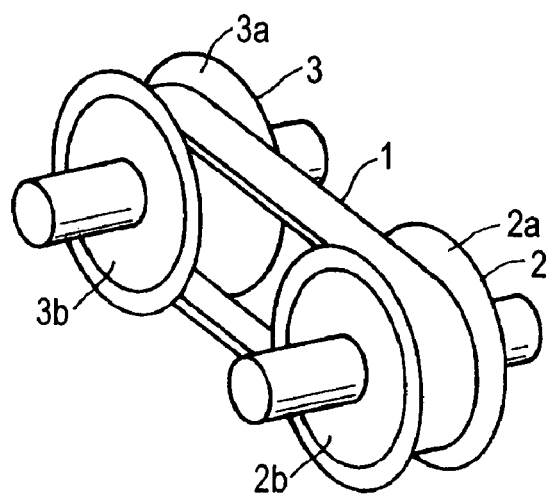
FIG. 7 is a perspective view of a continuously variable transmission.

The above power transmission chain is used for CVT shown in FIG. 7. In this case, as shown in FIG. 6, the interpiece 15 is shorter than the pin 14, the ends of the interpiece 15 are not in contact with the conical sheave surfaces 2c, 2d of the stationary sheave 2a and movable sheave 2b, while the ends of the pin 14 are in contact with the conical sheave surfaces 2c, 2d of the pulley 2, so that frictional force by the contacts enables power transmission. The pin 14 and interpiece 15, as described above, relatively move through rolling-contact, so that the pin 14 does not rotate with respect to the sheave surfaces 2c, 2d of the pulley 2, as a result, frictional loss is reduced and high power transmission efficiency is ensured.

What is claimed is:

1. A power transmission chain comprising:
    a plurality of links, said links comprising a front inserting portion and a rear inserting portion, into which pins are to be inserted; and
    a plurality of first pins and second pins that are arranged in a front and in a rear, respectively, and connect the links arranged in a width direction of the power transmission chain so that the front inserting portion of one of the plurality of links corresponds to the rear inserting portion of another of the plurality of links,
    wherein the one of the plurality of links longitudinally pivots with respect to the another of the plurality of links through relative rolling-contact movement of the first and second pins,
    wherein ones of the first and second pins are fixed to the front inserting portions of the one of the plurality of links and movably inserted in the rear inserting portions of the another of the plurality of links,
    wherein other of the first and second pins are movably inserted in the front inserting portion of the one of the plurality of links and fixed to the rear inserting portion of the another of the plurality of links,
    wherein the power transmission chain has an endless loop shape, having an interior outer circumference and an exterior outer circumference,
    wherein a residual compressive stress in a portion of the link facing the interior outer circumference is larger than a residual compressive stress in a portion of the link facing the exterior outer circumference, and
    wherein the plurality of links are permanently deformed.

2. The power transmission chain according to claim 1, wherein assuming that for each of the links in a state that pre-tension is not applied, a predetermined pitch is P, a first inclination angle of a fixing portion of the front inserting portion with respect to a chain proceeding direction is $\alpha$ and a second inclination angle of a fixing portion of the rear inserting portion with respect to the chain proceeding direction is $\beta$, when the pre-tension is applied to each of the links, the pitch changes into P+$\Delta$P, the first inclination angle changes into $\alpha - \Delta\alpha'$ and the second inclination angle changes into $\beta + \Delta\beta'$ where $\Delta P > 0$, $\Delta\alpha > 0$, and $\Delta\beta > 0$.

3. The power transmission chain according to claim 1, wherein a locus formed by a contact point between the first and second pins is an involute curve, and wherein a contact point between the first and second pins in a straight region of the chain is positioned inside with respect to a reference line which is an exact center line formed between the interior and exterior of the chain.

4. A power transmission apparatus comprising:
    a first pulley having conical sheave surfaces;
    a second pulley having conical sheave surfaces; and
    a power transmission chain according to claim 1 wound around the first and second pulleys.

5. A method of manufacturing a power transmission chain, comprising:
    connecting a plurality of links in a width direction of the power transmission chain, said links comprising a front inserting portion and a rear inserting portion, into which pins are to be inserted, using a plurality of first pins and a plurality of second pins that are arranged in a front and a rear, respectively, so that the front inserting portion of one of the plurality of links corresponds to the rear inserting portion of another of the plurality of links;
    applying pre-tension to the chain, the chain comprising an endless loop shape having an interior outer circumference and an exterior outer circumference; and
    causing, through the pre-tension, a residual compressive stress in a portion of the link facing the interior outer circumference to be larger than a residual compressive stress in a portion of the link facing the exterior outer circumference,
    wherein the one of the plurality of links longitudinally pivots with respect to the another of the plurality of links through relative rolling-contact movement of the first and second pins,
    wherein ones of the first and second pins are fixed to the front inserting portions of the one of the plurality of links and movably inserted in the rear inserting portions of the another of the plurality of links, and wherein others of the first and second pins are movably inserted in the front inserting portion of the one of the plurality of links and fixed to the rear inserting portion of the another of the plurality of links.

6. The method of manufacturing the power transmission chain according to claim 5, further comprising:

giving a larger deformation margin to a portion of a link of the chain facing an inside of the chain.

* * * * *